United States Patent [19]

Marteau et al.

[11] Patent Number: 5,276,332
[45] Date of Patent: Jan. 4, 1994

[54] APPARATUS FOR MEASURING THE α ACTIVITY OF A SOLUTION

[75] Inventors: Claude Marteau, Avignon; Marcel Durand, Bollene, both of France

[73] Assignee: Cogema Compagnie Generale des Matieres Nucleaires, France

[21] Appl. No.: 971,318

[22] Filed: Nov. 4, 1992

[30] Foreign Application Priority Data

Nov. 29, 1991 [FR] France .................. 91 14828

[51] Int. Cl.$^5$ .................. G01T 1/20; G01T 7/08
[52] U.S. Cl. .................. 250/432 R; 250/364; 250/370.02; 250/435
[58] Field of Search .............. 250/364, 370.02, 370.03, 250/432

[56] References Cited

U.S. PATENT DOCUMENTS 3,826,918 7/1974 Van Der Koogh et al. ........ 250/343

FOREIGN PATENT DOCUMENTS 162076 12/1980 Japan .................. 250/364
2077423 12/1981 United Kingdom .......... 250/370.02

OTHER PUBLICATIONS

"Measurement System for Alpha Emittors In Solution", Nuclear Instruments & Methods in Physics Research, vol. 225, No. 1, Aug., 1984, pp. 179-184.
"Detector for Radiation", Patent Abstracts of Japan, vol. 7 No. 282 (P-243) (1427) Dec. 16, 1983 and JP-A-58 156 876 (Tokyo Shibaura Denki K.K.) Sep., 1983.

*Primary Examiner*—Carolyn E. Fields
*Attorney, Agent, or Firm*—Pearne, Gordon, McCoy & Granger

[57] ABSTRACT

Apparatus for measuring the α activity of a solution and used for determining the plutonium concentration of a solution sampled from an irradiated nuclear fuel reprocessing installation and which comprises a rotary drum (20), which samples a film of solution in a vessel (20), in order to place it in front of a measuring probe (22). Between the probe (22) and the drum (20) is positioned a sealing disk (40) having three positions, which has an effective measuring region (48), a measuring chain quality checking region and a blank measuring region. In order to avoid a solution deposit by condensation on the disk (40) or on the end of the probe (22), a protective gas injection system (49) having passages traversing the vessel cover (16), scavenges the upper face of the sealing disk at three locations corresponding to the three active regions of the latter. A substantially uniform distribution of the gas flow between said three locations is ensured. The protective gas is then sucked in by a tube (122).

8 Claims, 3 Drawing Sheets

APPARATUS FOR MEASURING THE α ACTIVITY OF A SOLUTION

DESCRIPTION

The invention relates to an apparatus making it possible to measure the α activity of a solution, particularly in an irradiated nuclear fuel reprocessing plant, with a view to accurately determining the plutonium concentration of said solution.

The α activity of solutions treated in irradiated nuclear fuel reprocessing plants essentially results from the plutonium present in such solutions. The measurement of said α activity consequently makes it possible to accurately determine the plutonium concentration of the solution on which the measurements are performed.

For the purpose of measuring said α activity, use is made of specific equipments, which take account of both the limited range of the α radiation (a few mm) and the presence of β and γ radiations in said same solutions. As is more particularly illustrated by FR-A-2,482,312, for this purpose use is generally made of apparatus in which a solution film is sampled by a drum rotating about a horizontal axis or shaft, in a constant level vessel, so as to bring said film in front of a measuring probe placed above the drum.

In order that the results of the measurements performed on the solution to be checked can be usefully exploited, the apparatus must also make it possible to check the quality of the measuring probe and the measuring chain, in the presence of a reference source of known value, as well as a measurement of the response of the probe in the blank state, i.e. when no radiation reaches it.

In order to obtain this result, FR-A-2,482,312 proposes placing a reference source at the end of a pull cord making it possible to retract said source, or conversely bring it in front of the measuring probe. The operation of the blank probe is checked by placing in the tank a solution free from any α radiation. A gas circulation is also ensured in the upper part of the vessel, so as to prevent a film of the solution present in the latter from being deposited by condensation on the lower face of the measuring probe, which would falsify the measurements.

However, the apparatus described in FR-A-2,482,312 suffers from the disadvantage of being very difficult to employ, when it is wished to measure the response of the measuring probe in the absence of any α radiation. Thus, this involves stopping the circulation of the solution to be analysed within the vessel, in order to bring about a circulation therein of a blank solution with no α radiation.

Moreover, the circulation of gas intended to prevent condensation on the lower face of the measuring probe is such that it does not prevent a deposit by condensation on the probe if the flow rate or pressure of the gas is too low. Moreover, high gas pressures or flow rates produce turbulence, which also leads to solution deposits on the probe.

The invention is aimed at an apparatus for measuring the α activity of a solution, designed on the basis of the general principle of the apparatus described in FR-A-2,482,312, but in which it is easier to control or check the response of the measuring probe in the absence of α radiation, the risk of the measurements being falsified as a result of a deposit of the solution to be analysed by condensation or turbulence on the probe and on the apparatus parts located between the probe and the drum also being significantly reduced.

According to the invention, this result is obtained by means of an apparatus for measuring the α activity of a solution comprising a vessel able to receive the solution and which is sealed by a cover, a drum mounted so as to rotate on a horizontal shaft within the vessel, so as to be immersed in the solution present in the latter, means for rotating the drum in a given direction, a probe for measuring the α radiation and fitted above the drum, means for blowing a protective gas into an upper part of the vessel and means for recovering said gas, characterized in that it also comprises a sealing disk mounted so as to rotate on a vertical shaft, within the vessel, so as to be able to present between the drum and the measuring probe a measuring region having a window, a region for checking the quality of the measuring chain having a reference source, and a solid region, which are displaced by 120° with respect to one another about said vertical shaft, said blowing means having a protective gas supply tube, connected to passages traversing the cover of the vessel and issuing above the sealing disk in three locations positioned facing each of the said regions, said passages having sections such that the protective gas is distributed at each of the three locations substantially with the same flow rate, the recovery means having a protective gas discharge tube, which also traverses the cover of the vessel.

In a preferred embodiment of the invention, a first of the passages passes into the cover in a substantially horizontal direction orthogonal to the horizontal axis of the drum and coinciding with the rotation direction of the latter and then issues above the sealing disk by a circular opening positioned below the measuring source.

Advantageously, the discharge tube then issues into the vessel in an area located opposite to the measuring probe with respect to the first passage. This area can in particular be located beyond the peripheral edge of the sealing disk.

In order to permit an effective protection of the peripheral area of the sealing disk beyond the window formed in the latter, a branched passage issues above the sealing disk between the aforementioned circular opening and an adjacent part of the peripheral edge of the disk.

According to a preferred embodiment of the invention, the second and third passages issue into the vessel at two locations at 120° from the measuring probe, with respect to the vertical axis of the sealing disk, by two circular recesses provided with screens.

In order to also protect the peripheral area of the sealing disk when the window formed in the latter is located in one or other of these two locations, each of the screens has a notch issuing in the vicinity of the peripheral edge of the sealing disk.

In addition, passages having a smaller section also advantageously issue above a peripheral area of the sealing disk between the aforementioned locations.

BRIEF DESCRIPTION OF THE DRAWINGS

The invention is described in greater detail hereinafter relative to a non-limitative embodiment and with reference to the attached drawings, wherein show:

In FIG. 1, reference numeral 10 designates a measuring vessel, in which a solution S to be analysed is introduced and removed by means of two not shown ducts, which are orthogonal to the plane of the drawing. These ducts are arranged in such a way that the level of the solution S within the vessel 10 remains substantially constant, when the solution circulates in a continuous manner. An emptying duct 12 can be seen in FIG. 1.

Figure 1:
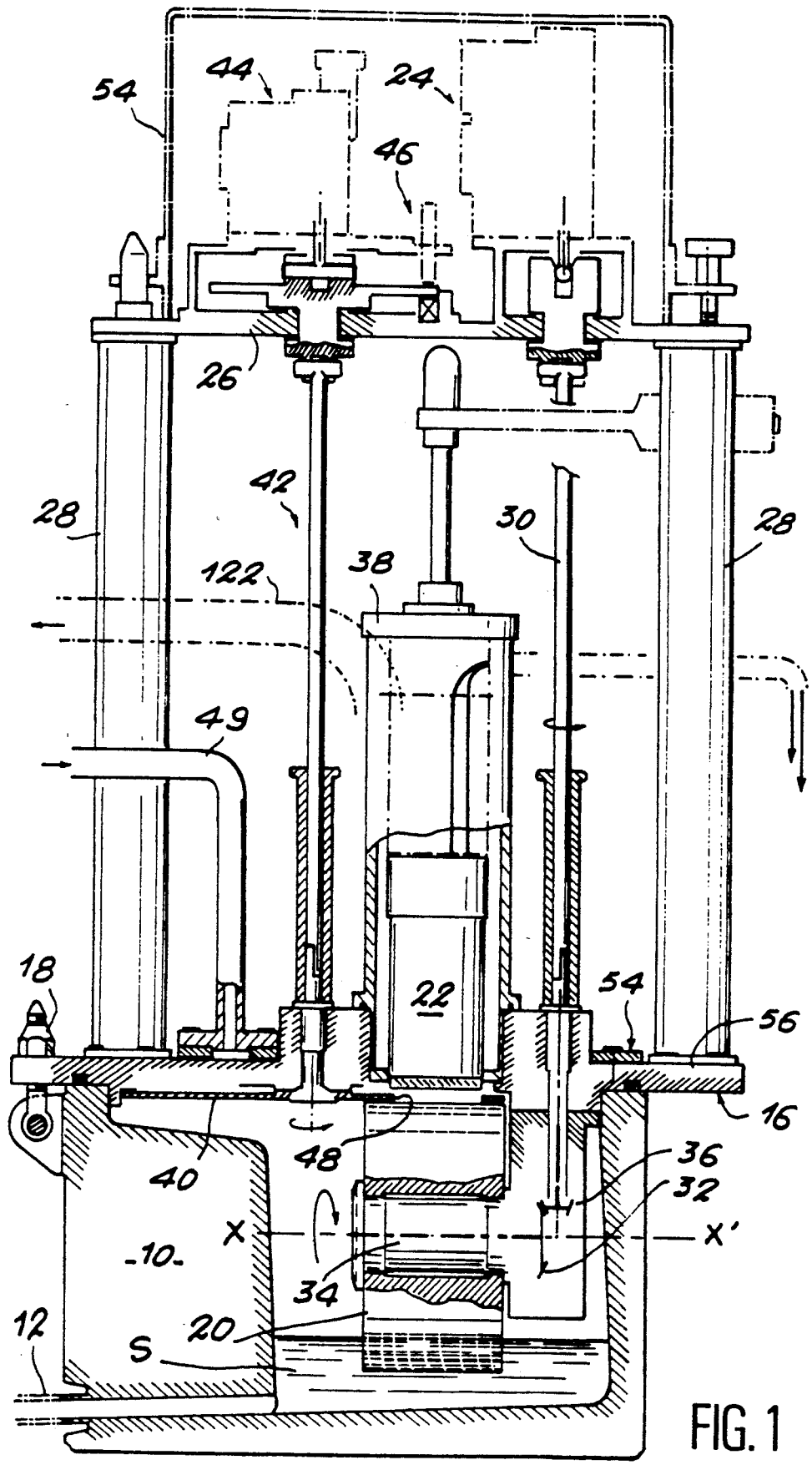
FIG. 1 in elevation and part sectional form, diagrammatically a measuring apparatus according to the invention.

At its upper end, the vessel 10 is tightly sealed by a horizontal cover 16. The fitting and dismantling of said cover advantageously take place by remotely manipulatable fixing means, such as tilting bolts 18 which cannot be lost. A drum 20 is mounted so as to rotate within the vessel 10, about a horizontal axis XX' materialized by a shaft 34, which is integral with a vertical bracket 36 fixed beneath the cover 16. The subassembly formed by the drum 20 and the bracket 36 carrying the vertical driving shaft of the drum and the coupling is dismantlable, which permits its replacement.

The dimensioning and arrangement of the drum 20 are such that its lower part is permanently immersed in the solution S circulating in the vessel 10, whilst its upper generatrix is located at a very small distance (a few mm) from the lower face of the cover 16. More specifically, the upper generatrix of the drum 20 is positioned immediately below the lower face of a measuring probe 22, which is fitted above the cover 16 and tightly traverses the latter.

Thus, during its rotation at a constant speed, the drum 20 makes it possible to bring a film of the solution S in front of the measuring probe 22, whilst forming a screen between the solution S present in the vessel and the measuring probe 22, with respect to the $\beta$ and $\gamma$ radiations emitted by the solution. In order to bring about an optimum checking of the thickness of the solution film transported in front of the measuring probe 22 by the drum 20, the latter has an outer surface with a very fine roughness.

As is very diagrammatically illustrated in FIG. 1, the rotation at constant speed of the drum 20 is ensured by a geared motor 24, which is installed on a horizontal support plate 26 supported by columns 28 fixed to the upper face of the cover 16. The geared motor 24 rotates a vertical shaft 30, which tightly traverses the cover 16 and rotates, by its lower end, the hub of the drum 20, via bevel pinions 32.

The measuring probe 22 can in particular be constituted by a scintillation detection probe, which counts the $\alpha$ particles emitted by the solution. The vertical axis of said probe 22 intersects the horizontal axis XX' of the drum 20. The probe 22 is placed in a tight box 38, whose lower end is received in a circular recess traversing the cover 16 above the drum 20.

The measuring apparatus according to the invention also comprises a sealing disk 40 of limited thickness, which is placed in the vessel 10 immediately below the cover 16. More specifically, said sealing disk 40 is a flat disk, which is integral with a vertical shaft 42 tightly traversing the cover 16 and located at a point diametrically opposite to that occupied by the shaft 30, with respect to the axis of the measuring probe 22. Moreover, the arrangement of the sealing disk 40 is such that a part of said disk is located between the drum 20 and the measuring probe 22.

The sealing disk 40 can be rotated about its vertical axis by a second geared motor 44 mounted on the support plate 26. To this end, the output shaft of the geared motor 44 is engaged on the upper end of the vertical shaft 42. The support plate 26 also carries indexing means diagrammatically illustrated at 46 in FIG. 1 by means of which the sealing disk 40 can be immobilized in three previously established positions at 120° from one another about the vertical axis of the shaft 42.

These three positions respectively correspond to a position for measuring the $\alpha$ activity of the solution to be analysed, to a position for checking the quality of the measuring chain and to a blank measuring position, i.e. a position when there is no $\alpha$ radiation, which makes it possible for uses to be informed of any deposit by condensation of a solution film on the lower face of the exposed probe 22 in the vessel 10. To these three positions of the sealing disk 40 correspond three regions of said disk and which can be located between the drum 20 and the measuring probe 22.

Figure 3:
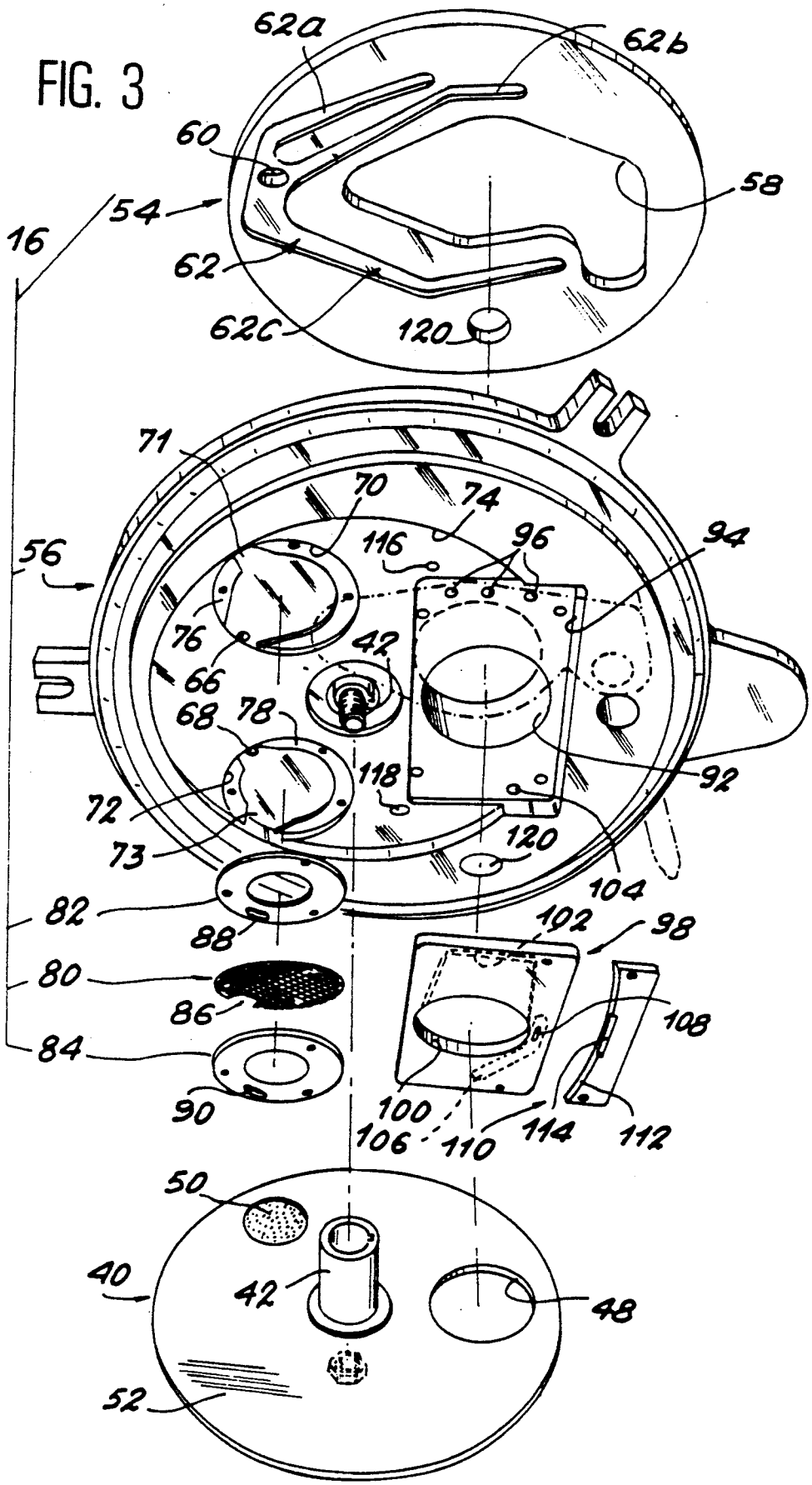
FIG. 3 an exploded perspective view showing, as a view from below, the different parts forming the vessel cover, as well as the sealing disk, in plan view.

The first region, which makes it possible to measure the $\alpha$ activity of the solution S to be analysed, is in the form of a circular window 48 (FIG. 3). The second region, which makes it possible to check or control the quality of the measuring chain comprises a reference source 50, emitting $\alpha$ radiation and which is located in a circular recess formed on the upper face of the disk 40. Finally, the third region, which permits the performance of blank measurements in the absence of $\alpha$ radiation, corresponds to a solid region of the disk 40, spaced by 120° about the vertical axis thereof with respect to the circular window 48 and the reference source 50. This solid region is symbolically designated by crosses at 52 in FIG. 3.

When the circular window 48 faces the measuring probe 22, in the manner diagrammatically shown in FIG. 1, the $\alpha$ radiation emitted by the solution film transported by the drum 20 reaches the measuring probe 22, in such a way that the latter can perform the measurement of said radiation. When the reference source 50 is brought in front of the measuring probe 22, it is the known $\alpha$ radiation emitted by said reference source which is detected by the probe 22, in such a way that it is possible to check the quality of the measuring chain. Finally, when the solid region 52 of the sealing disk 40 is brought in front of the measuring probe 22, as is diagrammatically illustrated in FIG. 2, the measurements performed by the probe solely represent the stray $\alpha$ radiation supplied by solution deposits due to condensation both on the lower face of the probe 22 and on the sealing disk 40.

As is very diagrammatically illustrated by FIG. 1, the different elements of the measuring apparatus above the cover 16 are advantageously assembled with one another so as to be remotely disassemblable by means of a remote manipulator. This more particularly applies with respect to the fitting of the support plate 26 on the columns 28, the fitting of said columns on the cover 16, the fixing of a protective cap 54 on the support plate 26, around the geared motors 24 and 44, as well as the fitting of said geared motors on the support plate 26. In addition, the shafts 30 and 42 are produced in several parts, which engage in one another by simply fitting in. This also applies with respect to the fixing of the protective cap 38 of the measuring probe 22 on the cover 16. The different means used for this purpose do not form part of the invention, so that no detailed description thereof will be given.

Figure 2:
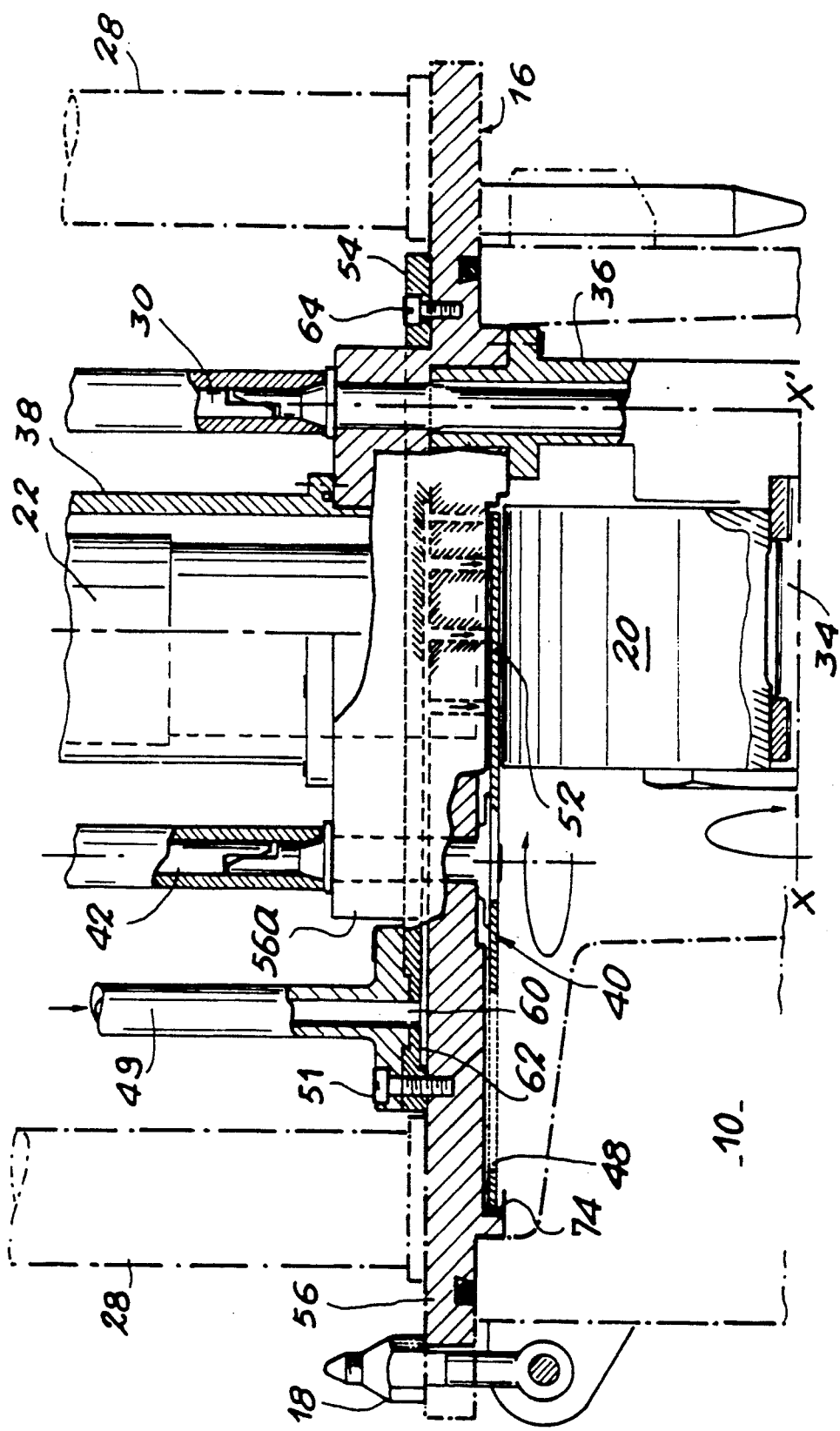
FIG. 2 a sectional view comparable to FIG. 1 illustrating on a larger scale the cover of the vessel of the apparatus and the adjacent parts.

As has been indicated hereinbefore, the accuracy of the measurements performed with the aid of an apparatus like that described relative to FIGS. 1 and 2 could be disturbed by condensation of the solution on the lower face of the measuring probe 22 and on the parts of the sealing disk 40 which must be located in front of said probe. To limit this risk to the greatest possible extent, an improved system has been developed for blowing a protective gas into the areas in question and also for the recovery of said gas, making it possible to obtain the desired efficiency for a gas flow rate (e.g. between 5 and approximately 1.5 l/min) and a suction action (e.g. between approximately 5 and 35 mm water column) which are as low as possible, so as not to disturb the solution film presented by the drum 20 in front of the measuring probe 22. This protective gas blowing and recovery system, which preferably uses air, but which could also use a random neutral gas, will now be described in greater detail relative to FIGS. 2 and 3.

The protective air is brought up to the apparatus cover 16 by an air supply tube 49, which is fixed to the upper face of the cover 16, e.g. by means of screws 51. The protective air carried by the supply tube 49 is distributed within the vessel 10 at different points located above the sealing disk 40 using passages provided for this purpose in the thickness of the cover 16. These passages make it possible to distribute the air supplied by the supply tube 49 at three locations located above the sealing disk 40 and respectively corresponding to the regions of the disk in which are located the circular window 48, the reference source 50 and the solid region 52.

As is more particularly illustrated by FIG. 3, the distribution of the protective air to the three aforementioned locations is in practice obtained by producing the cover 16 in the form of several assembled parts which comprise, starting from the top, a distributing plate 54, a plate 56 forming a cover, as well as different complementary parts fixed beneath the plate 56 and which will be described in detail hereinafter.

In its central portion, the distributing plate 54 has an opening 58, whose shape is complementary to that of an upper projecting portion 56a (FIG. 2) of the plate 56 forming the cover and to which is fixed the box 38 surrounding the measuring probe 22 and traversed by the vertical shafts 30, 42.

The distributing plate 54 is also traversed by a hole 60 to which is connected the air supply tube 49. This hole 60 issues into an air distributing groove 62 made on the lower face of the distributing plate 54 at the junction point between three branches 62a, 62b and 62c of said groove 62. The relatively short branch 62a and the relatively long branch 62b are located on the same side of the opening 58, whereas the relatively long branch 62c is located on the other side of said opening.

When the distributing plate 54 is fixed to the plate 56 forming a cover by screws 64, in the manner illustrated in FIG. 2, the hole 60 to which is connected the air supply tube 49 is positioned opposite to the measuring probe 22 with respect to the vertical driving shaft 42 of the sealing disk 40.

The plate 56 forming the cover is traversed perpendicular to its faces by a certain number of holes, all of which issue into one or other of the branches of the groove 62, when the distributing plate 54 is fixed to the plate 56 forming the cover.

The holes traversing the plate 56 forming a cover firstly consist of two holes 66 and 68, which respectively issue into the branches 62a and 62c of said groove 62 in the vicinity of the hole 60. Each of these holes 66 and 68 respectively issues into a circular recess 70, 72 formed on the lower face of the plate 56 forming the cover, tangentially to the interior of a hollowed out portion 74, which is also circular and is machined into said lower face to receive the sealing disk 40, as illustrated in FIG. 2. More specifically, each of the holes 66, 68 issues in the vicinity of the edge of the corresponding circular recess 70, 72.

The axes of the circular recesses 70, 72 are equidistant of the vertical pivoting axis of the sealing disk 40 and are separated by 120° from one another and from the probe 22, so that each of these circular recesses is positioned facing one of the three regions 48, 50 and 52 of the sealing disk 40, when the third region faces the measuring probe 22. Moreover, the diameter of each of the recesses 70, 72 is substantially equal to the diameter of the circular window 48 formed in the disk 40, so as to permit an effective scavenging of the upper face of the disk in the regions liable to be located below the measuring probe 22.

Outside the locations where the holes 66 and 68 issue and the regions 71, 73 immediately adjacent to the edges of the hollowed out portion 74, each of the circular recesses 70, 72 has on its periphery a shoulder respectively designated by the references 76 and 78 in FIG. 3. These shoulders 76, 78 make it possible to fix, e.g. by using not shown screws, a metal screen 80 fixed between two rings 82, 84. These screens 80 make it possible to distribute in a relatively uniform manner the cleaning air admitted into each of the recesses 70, 72 by the holes 66, 68, in order to ensure a scavenging of the region 48, 50 or 52 of the sealing disk 40 positioned facing each of these recesses.

Moreover, FIG. 3 shows that each of the screens 80 has, on a portion of its periphery to be placed against the peripheral edge of the hollowed out portion 74, a notch 86 positioned facing two notches 88, 90 respectively formed in the rings 82, 84. In combination with the regions 71, 73 of the circular recesses 70, 72, this characteristic makes it possible to preferably inject a larger air quantity onto the peripheral area of the sealing disk 40 placed between the regions 48, 50 or 52 of the disk and its adjacent peripheral edge.

This provides an effective protection of the portion of the sealing disk 40 located between the circular window 48 and the peripheral edge of the disk, when said window 48 is positioned facing one or other of the screens 80. Thus, in the absence of regions 71, 73 and notches 86, 88, 90, most of the air injected by the circular recesses 70, 72 would escape via the circular window 48 without protecting the adjacent peripheral region of the disk 40.

At a location at 120° from the circular recesses 70, 72 and at the same distance from the rotation axis of the sealing disk 40, the plate 56 forming the cover is traversed by a bore 92, in which is received the end of the box 38 housing the measuring probe 22. This bore 92 issues in the centre of a rectangular recess 94 formed on the lower face of the plate 56. The small sides of this rectangular recess 94 are parallel to the radius of this sealing disk 40 passing through the axis of the bore 92. Three holes 96 traverse the plate 56 forming a cover, so as to issue by their upper ends in the terminal portion of the branch 62b of the groove 62 and by their lower ends in the vicinity of one of the small sides of the rectangular recess 94. More specifically, the holes 96 issue into the rectangular recess 94 on the upstream side with respect to the bore 92 considering the rotation direction of the drum 20.

A rectangular deflecting plate 98 having the same dimensions as the recess 94 is fixed in the latter, e.g. by means of not shown screws. This plate is centrally provided with a circular opening 100 formed in the extension of the bore 92 and whose diameter is substantially equal to that of the circular window 48 of the sealing disk 40. A milled portion 102 made on the upper face of the deflecting plate 98 and which is substantially trapezoidal, makes it possible to channel the air from the holes 96 towards said opening 100. Thus, the air is injected into the opening 100 in a horizontal direction orthogonal to the rotation axis XX' of the drum 20 and which coincides with the rotation direction of the latter.

In the vicinity of the edge of the rectangular recess 94 opposite to that along which issue the holes 96, a hole 104 traverses the plate 56 forming a cover. As is shown in FIG. 3, said hole 104 communicates by its upper end with the end of the branch 62c of the groove 62 made in the distributing plate 54. Moreover, the hole 104 issues by its lower end at the end of a passage 106 made on the upper face of the deflecting plate 98. The opposite end of the passage 106 is located between the circular opening 100 and the outwardly turned edge of the deflecting plate 98 with respect to the rotation axis of the sealing disk 40, when the deflecting plate is fixed beneath the plate 56 forming a cover.

In this part of the deflecting plate 98 located between the circular opening 100 and the edge opposite to the rotation axis of the sealing disk 40, the deflecting plate 98 is traversed by a notch 108, which issues into the passage 106. This notch 108 issues onto the lower face of the deflecting plate 98 at a location immediately adjacent to a closing part 110, which is to be fixed beneath the deflecting plate 98, in the part of said plate located beyond the peripheral edge of the sealing disk 40. To this end, the part 110 has an inner, circular arc-shaped edge 112, which completes the peripheral edge of the hollowed out portion 74 formed in the plate 56 forming a cover, when the deflecting plate 98 and the part 110 are fixed in the rectangular recess 94. In its central portion adjacent to the inner, circular arc-shaped edge 112, the part 110 has on its lower face an indentation 114 permitting the passage of the rotary drum 20.

Thus, part of the air admitted by the branch 62c of the groove 62 passes through the hole 104 and then the passage 106 up to the notch 108, by which said air ensures the scavenging of the upper face of the sealing disk 40 in the peripheral area of the latter located between the region 48, 50 or 52 of the disk positioned in front of the probe 22 and the peripheral edge of said disk. Thus, when it is the circular window 48 which is in front of the probe, an effective protection of the upper face of the disk in the area between the window and the adjacent portion of the peripheral edge of the sealing disk is obtained, which would not have been the case if the protection had been ensured simply by the air carried by the milled portion 102.

It should be noted that the distribution of the air between the three locations corresponding to the regions 48, 50 and 52 of the sealing disk 40 is ensured in such a way that the air flow rate is substantially equal for each of these locations.

To complete the protection of the upper face of the sealing disk 40, FIG. 3 also shows that the plate 56 forming a cover is traversed by two other holes 116, 118, which respectively issue by their upper end in the vicinity of the end of the branch 62a of the groove 62 and in the branch 62c of the groove 62. These two holes 116, 118 issue directly onto the lower face of the plate 56 forming a cover, within the hollowed out portion 74, at locations in the vicinity of the peripheral edge of said portion and at approximately 60° on either side of the axis of the bore 92 with respect to the rotation axis of the sealing disk 40. This provides a complementary protection for the upper face of the sealing disk 40, in the peripheral area of the disk which is brought in front of the measuring probe 22, when the disk rotates about its axis.

Finally, the recovery of the protective air injected above the sealing disk 40 by the different passages described hereinbefore, is ensured by a passage 120, which successively traverses the plate 56 forming the cover and the distributing plate 54 and issues into a discharge tube diagrammatically indicated at 122 in FIG. 1, which is fixed to the distributing plate 54, e.g. by not shown screws.

The passage 120 issues onto the lower face of the plate 56 forming a cover beyond the peripheral edge of the hollowed out portion 74, in an area opposite to the bore 92 able to receive the measuring probe 22, with respect to the passage constituted by the holes 96 and by the milled portion 102, by which the protective air is injected onto the upper face of the region of the sealing disk located in front of the measuring probe. In other words, that portion of the passage 120 made in the plate 56 forming a cover is opposite to the holes 96 with respect to the bore 92.

As a result of the arrangement described in detail hereinbefore with reference to FIG. 3, there is a particularly effective protection of the different areas of the upper face of the sealing disk 40 which may be located in front of the measuring probe 22 and the lower face of said probe, without it being necessary to inject a high gas flow which might cause turbulence leading to solution deposits on the probe. Thus, an air flow of approximately 9 l/min under a pressure of 0.2 bar is adequate to achieve the sought result. In a comparable manner, the vacuum ensuring the air recovery by the passage 120 can also be very low (e.g. 5 to 35 mm water column).

Obviously the invention is not limited to the embodiment described in exemplified manner hereinbefore and covers all variants. Thus, it is clear that the practical construction of the different passages making it possible to ensure the distribution of protective air or gas above the disk can undergo numerous modifications without passing outside the scope of the invention.

We claim:

1. Apparatus for measuring the $\alpha$ activity of a solution comprising a vessel able to receive the solution and which is sealed by a cover, a drum mounted so as to rotate on a horizontal shaft within the vessel, so as to be immersed in the solution present in the latter, means for rotating the drum in a given direction, a probe for measuring the $\alpha$ radiation and fitted above the drum, means for blowing a protective gas into an upper part of the vessel and means for recovering said gas, wherein said apparatus also comprises a sealing disk mounted so as to rotate on a vertical shaft, within the vessel, so as to be able to present between the drum and the measuring probe a measuring region having a window, a region for checking the quality of the measuring chain having a reference source, and a solid region, which are displaced by 120° with respect to one another about said vertical shaft, said blowing means having a protective gas supply tube, connected to passages traversing the cover of the vessel and issuing above the sealing disk in three locations positioned facing each of the said regions, said passages having sections such that the protective gas is distributed at each of the three locations substantially with the same flow rate, the recovery means having a protective gas discharge tube, which also traverses the cover of the vessel.

2. Measuring apparatus according to claim 1, wherein a first of said passages passes into the cover in a substantially horizontal direction, orthogonal to the horizontal axis of the drum and coinciding with the rotation direction of the latter, in order to issue above the sealing disk by a circular opening located below the measuring probe.

3. Measuring apparatus according to claim 2, wherein the discharge tube issues into the vessel in an area located opposite to the measuring probe with respect to the first passage.

4. Measuring apparatus according to claim 3, wherein the area in which issues the discharge tube is located beyond a peripheral edge of the sealing disk.

5. Measuring apparatus according to claim 2, wherein the passages also comprise a branched passage, which issues above the sealing disk between said circular opening and an adjacent portion of the peripheral edge of the disk.

6. Measuring apparatus according to claim 1, wherein a second and a third of said passages issue into the vessel at two locations located at 120° from the measuring probe, with respect to the vertical axis of the sealing disk, by two circular recesses provided with screens.

7. Measuring apparatus according to claim 6, wherein each of the screens has a notch, which issues in the vicinity of a peripheral edge of the sealing disk.

8. Measuring apparatus according to claim 1, wherein said passages also comprise passages having a smaller section, which issue above the peripheral area of the sealing disk between the said locations.

* * * * *